Figure 1:
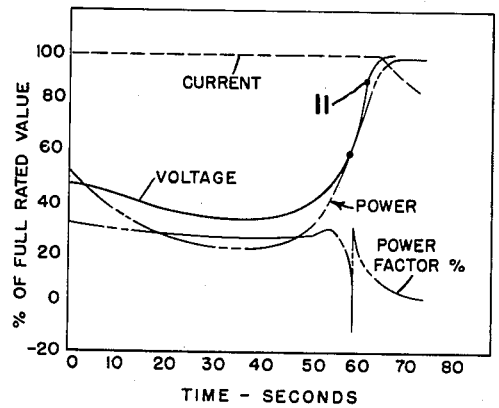

Nov. 13, 1962

W. F. PESCHEL 3,064,109

AUTOMATIC CONTROL OF INDUCTION HEATING
CIRCUITS HAVING A MAGNETIC LOAD

Filed Jan. 15, 1959

WILLIAM F. PESCHEL
INVENTOR.

BY *Alfred C. Bely*

ATTORNEY

United States Patent Office 3,064,109
Patented Nov. 13, 1962

3,064,109
AUTOMATIC CONTROL OF INDUCTION HEATING CIRCUITS HAVING A MAGNETIC LOAD
William F. Peschel, Birmingham, Mich., assignor to The Ohio Crankshaft Company, Cleveland, Ohio, a corporation of Ohio
Filed Jan. 15, 1959, Ser. No. 786,972
9 Claims. (Cl. 219—10.77)

This invention pertains to the art of induction heating, and more particularly to induction heating of work pieces having magnetic characteristics which disappear when the temperature reaches predetermined values.

The invention is particularly applicable to the art of high frequency induction heating of steel work pieces to elevated temperatures prior to the forging of such steel work pieces and will be described with particular reference thereto, although it will be appreciated that the invention has broader applications and may be applied to low frequency heating and/or melting of such steel work pieces.

In the art of induction heating of steel work pieces to the forging temperature, the principal problem is to insure that each work piece is heated to approximately the same elevated temperature above the Curie temperature where the steel work piece loses its magnetic characteristics. This is usually done by starting with a work piece or work pieces of substantially uniform temperatures, such as room temperature, and supplying varying, but known, amounts of electrical power thereto for predetermined time periods. If the total power supplied at any one moment is known, and can be predetermined, accurate temperature control can be obtained by means of timing the heating cycle.

However, this problem becomes complicated if the heating cycle is stopped for any reason before its completion. If the entire heating cycle is repeated, the residual heat in the work piece, plus the additional heat added by the repeated cycle may be sufficient to melt the work piece, with possible serious damage to the heating coil. If only a portion of the heating cycle is repeated, the problem follows that the workpiece may not be heated to the necessary forging temperature and serious damage will result to the forging dies. Various ways have been proposed in the past to prevent this problem, but mostly they have been concerned with preventing starting of the heating cycle until the partially heated workpiece has been removed and a new workpiece at room temperature inserted. However, if the workmen should re-insert a partially heated workpiece, the problem of melting of the workpiece in the coil would still remain.

Another problem in the field of induction heating is the changes in the characteristics of the workpiece as it is heated. Thus, at room temperature the workpiece has relatively low electrical resistance and magnetic characteristics. As the workpiece is heated, its resistance goes up and when the temperature reaches the Curie temperature, it loses its magnetic characteristics. The result is that, for a given voltage supplied to the induction heating coil, the power input, and thus the current to the coil, increases from an initial amount for a short period of time and then decreases rapidly to a value substantially below the initial amount. As the current is usually the limiting factor on the power source, it will thus be seen that unless a suitable control is provided which increases the current to the coil during the initial part of the heating cycle (i.e., before the described changes in the electrical and magnetic characteristics of the workpiece take place), an unduly long period of time will be required to supply the required power to the workpiece. This has been provided for in some instances in the prior art by means of a timer which changes the voltage across the coil at the predetermined time intervals in the heating cycle. However, such an arrangement may produce current surges which exceed the setting of the overload current relays and thus shut the apparatus down.

Further on the problem of partially heated work pieces in the coil, it has been proposed heretofore to provide motor-driven potentiometers which reduce the voltage across the coil whenever the heating cycle is momentarily shut down and then gradually increase the voltage until the current reaches 100% of its desired value. However, such motor driven potentiometers are expensive and are slow to act, oftentimes requiring 30 to 90 seconds to bring the current up to 100% of its rated value.

The present invention overcomes all of the above-referred to problems and others by maintaining the current to the heating coil constant at 100% of its rated value until the work piece approaches or passes through the Curie temperature and the voltage is rising rapidly, and at a predetermined voltage shifting from a regulation responsive to such current to a regulation responsive to the voltage on the coil to thereafter maintain the voltage substantially constant at 100% of its rated value. Thus the present invention controls the voltage applied to the coil to maintain the current in the coil constant until the voltage commences to increase rapidly and approaches the maximum value, at which point voltage regulation is applied to maintain the voltage constant thereafter.

The present invention also has provision for automatically connecting additional capacitance in circuit with the induction heating coil as the magnetic characteristics of the load change. This function is carried out in response to the instantaneous magnitude of the voltage applied to the heating coil, rather than as part of a timing cycle which may not be accurate for the particular work load being heated.

Also, where the induction heating equipment has an automatic feed mechanism which feeds successive work pieces into and through the heating coil, the present control has provision for starting the operation of said feed mechanism at a predetermined point in the heating cycle. This additional control function also operates in response to the instantaneous magnitude of the voltage applied to the heating coil.

It is an object of this invention to provide a novel and improved control for induction heating equipment.

It is also an object of this invention to provide such a control which is directly responsive to the power conditions at the induction heating coil, and does not depend for its operation upon a timer which is pre-set according to certain assumptions which may or may not hold true for the particular work load being heated.

Another object of this invention is to provide such a control which insures that the maximum available power is supplied to the heating coil throughout the initial phase of the heating operation.

A further object of this invention is to provide such a control which, during the initial phase of the heating operation, functions in response to the magnitude of the current being supplied to the heating coil so as to hold that current at substantially its full rated value.

A further object of this invention is to provide such a control which at the end of the initial phase of the heating operation, when the characteristics of the work load change, automatically switches over to regulate the voltage applied to the heating coil so as to hold that voltage at substantially its full-rated value.

A further object of this invention is to provide such a control which functions automatically to connect additional capacitance in circuit with the heating coil at the proper point in the heating cycle.

A further object of this invention is to provide such control which, when used in conjunction with induction heating equipment having an automatic mechanism for feeding the work pieces into and through the heating coil, causes such automatic feed mechanism to begin its operation at a predetermined point in the heating cycle so that the likelihood of producing underheated work pieces is reduced.

Additional objects and advantages of this invention will be apparent from the following description of a presently preferred embodiment thereof, which is illustrated in the accompanying drawing.

Figure 2:
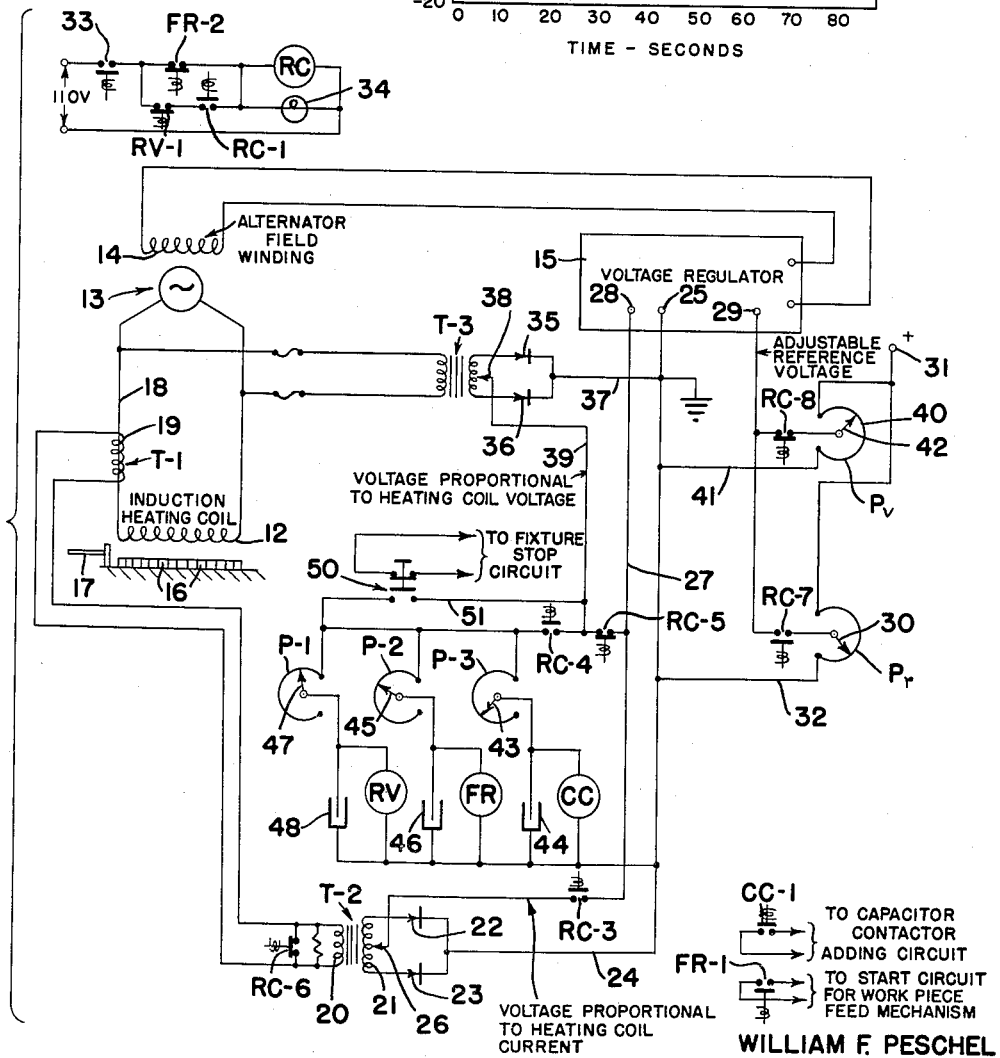

In the drawing:

FIGURE 1 shows typical characteristic curves of induction heating equipment having a static magnetic load during the initial phase of the heating operation, with the current held constant; and FIGURE 2 is a schematic circuit diagram of one embodiment of the present control.

Referring first to FIGURE 1, this figure shows the typical induction heating characteristics for a static magnetic load during the beginning of the heating cycle, starting with the load at room temperature and with the current to the heating coil held at substantially 100% of its full rated value. Initially, the load, which may be of magnetic steel, has electrical resistance and magnetic characteristics such that the heating inductor draws its full rated current when at a voltage appreciably below its full rated voltage. Thus, as shown in FIG. 1, 100% full rated current may be maintained during approximately the first 50 seconds of the heat cycle with the output voltage of the heating equipment operating at between about 48% to 32% of its full rated value. However, as the work piece heats up, its electrical and magnetic characteristics will change. The voltage required to maintain one hundred percent rated current output begins to rise sharply, this sharply rising portion of the voltage curve beginning at about 50 seconds in FIG. 1. In order to prevent the voltage from increasing beyond its full rated value for the induction heating equipment being used, a suitable voltage regulator is arranged to control the output of the equipment in response to the magnitude of the voltage, preferably beginning at the point 11 on the characteristic voltage curve in FIG. 1.

In the past, it was attempted to pre-set the point at which the voltage responsive regulation takes over by means of a timer. During the initial portion of the heat cycle (before the voltage responsive regulation took over), the output voltage of the machine was set at some suitable value well below its 100% rated value. With this intermediate voltage setting, the current was usually at some value below the full rated value. As will be quite evident from the sharply rising portion of the voltage curve in FIG. 1, which is typical, it is inherently difficult to set the timer so that it will bring in the voltage regulator at precisely the desired time to prevent the voltage from rising substantially beyond the full rated value for the equipment. Obviously, the setting of the timer is quite critical and due to individual variations from one work load to the next, the use of a pre-set timer was not completely adequate, even where the work load was initially at room temperature.

An even more serious problem is encountered where the work load initially is not at room temperature, but at a higher temperature. This would occur when the equipment is shut down for a short time and then started up again. The work pieces left in the heating equipment will have some indeterminate residual heat due to their having been partially heated before the equipment was shut down. In such cases, if the timer is set on the basis of the characteristic voltage curve shown in FIG. 1 which is true only for a work load which initially is at room temperature, there is a very serious likelihood that the work load will be overheated. This could result in damage to the liner of the induction heating coil. In some instances, actual melting of the work pieces would take place, resulting in considerable down time to remove such material from the induction heating coil.

If, on the other hand, the partially heated work pieces are removed from the induction heating coil when the equipment has a short down time, it is necessary to descale these work pieces and then manually load them back into the induction heating equipment for reheating. This involves substantial expense.

It has been proposed heretofore to avoid this difficulty by providing an arrangement which automatically reduces the voltage to a minimum value whenever the operating cycle of induction heating equipment is interrupted. In such equipment, each time the heat cycle is again started, the feed mechanism which feeds the work pieces through the induction heating coil starts immediately. The voltage is increased gradually until the current is approximately at its full rated value. However, because of the reduced power applied while the current is well below its full rated value, this arrangement resulted in a large percentage of underheated work pieces which had to be descaled and passed through the induction heating coil again. Another disadvantage of such equipment was the unduly long starting time during which the input power to the induction heating coil was at a low level. Also, such equipment was comparatively expensive.

The present invention is directed to a novel arrangement which senses the current to the induction heating coil during the initial portion of the heating cycle. During this time the voltage regulator, which controls the output voltage from the alternator which supplies the power to the induction heating coil, operates in response to the magnitude of this current in such manner as to hold this current at substantially its 100% rated value. This condition prevails until the output voltage from this alternator has risen sharply to the point 11 on its characteristic curve in FIG. 1. The present invention incorporates means for automatically switching the voltage regulator over from the initial condition, in which it is operated in response to the magntude of the current to the induction heating coil, to a condition in which it is operated in response to the magnitude of the voltage applied to the induction heating coil. Following this switch-over, the voltage regulator acts to maintain the voltage across the induction heating coil substantially constant at about its 100% rated value. As indicated in FIG. 1, during this later time in the heating cycle when the voltage is held at its 100% rated value, the current will be at a level somewhat below its 100% rated value.

The present invention also incorporates provision for controlling the automatic feeding of the work pieces through the induction heating coil in such a manner that the feeding of the work piece does not begin until the heating cycle has almost reached the point at which the voltage across the induction heating coil is near its 100% rated value. With this novel arrangement, the likelihood of feeding the work pieces through the induction heating coil before they have had a chance to become fully heated is minimized.

As already mentioned, the magnetic characteristics of the work pieces change during the heating cycle, particularly at the time when the voltage starts to rise sharply, as shown in FIG. 1. When this happens, it is desirable to connect suitable additional capacitance across the induction heating coil. For this purpose, it has been known heretofore to provide a suitable contactor arrangement which may be closed to connect a capacitor in circuit with the induction heating coil. The present invention incorporates provision for doing this in response to the magnitude of the voltage supplied to the induction heating coil. Such addition of the capacitor to the induction heating coil circuit takes place shortly before the voltage regulator is switched over from its initial current-responsive operation to its later voltage-responsive operation.

Referring to FIG. 2, the alternator which supplies power to the induction heating coil 12 is designated generally by the reference numeral 13. This alternator is provided with a field winding 14. The voltage applied across the field winding is determined by a voltage regulator 15. The magnitude of the voltage applied by the voltage regulator 15 to the alternator field winding 14 determines the output power of the alternator.

FIGURE 2 shows schematically a plurality of work pieces 16 which are arranged to be inductively heated by the induction heating coil 12. A suitable automatic feed mechanism, which is indicated schematically by the pusher 17 in FIG. 2, is arranged to push the successive work pieces endwise into and through the induction heating coil. In the actual physical embodiment, of course, the work pieces move axially through the middle of the induction heating coil 12.

In accordance with the present invention, there is provided means for controlling the voltage regulator output in response to the magnitude of the current to the induction heating coil 12 during the initial phase of the heating cycle. To this end there is provided a current transformer T–1, whose primary is constituted by one of the lines 18 leading from the alternator 13 to the induction heating coil 12. The secondary winding 19 of this transformer has the primary winding 20 of a transformer T–2 connected across it. The secondary winding 21 of transformer T–2 has its opposite ends connected to each other through rectifiers 22 and 23 and thence through line 24 to a terminal 25 of the voltage regulator 15 which is at a fixed potential, such as ground.

The secondary winding 21 of transformer T–2 is provided with a center tap 26 which is connected through a normally-open set of contacts RC–3 of relay RC and through line 27 to a terminal 28 at the voltage regulator 15.

It will be apparent that with this arrangement, when the relay contacts RC–3 are closed, the voltage appearing across the terminals 28 and 25 of the voltage regulator will be proportional to the magnitude of the current supplied by the alternator 13 to the induction heating coil 12. At this time, this voltage at terminal 28 controls the output voltage of the voltage regulator so that the latter applies a corresponding volage across the alternator field winding 14.

The voltage regulator has another terminal 29 which is connected through the normally-open contacts RC–7 of relay RC to the adjustable contact 30 of a potentiometer $P_r$. One end of the resistance element of this potentiometer is connected to a suitable voltage source 31. The opposite end of this resistance element is connected through line 32 to the voltage regulator terminal 25. With this arrangement, depending upon the setting of the adjustable contact 30 of potentiometer $P_r$, a suitable reference voltage is applied to the voltage regulator terminal 29.

The voltage regulator 15 functions automatically to compare the voltages on its respective terminals 28 and 29. If there is a difference between these voltages, the voltage regulator changes the voltage applied to the alternator field winding 14 in such a manner as to reduce this difference to zero. This action of the voltage regulator is, of course, well known and any one of a number of different voltage regulators may be used for this purpose. Therefore, the details of the voltage regulator, per se, form no part of the present invention.

With the foregoing arrangement, when both sets of normally-open relay contacts RC–3 and RC–7 are closed, as described hereinafter, the terminal 28 at voltage regulator 15 has a voltage which is proportional to the magnitude of the current to the induction heating coil 12, while the terminal 29 at the voltage regulator has a voltage which is determined by the setting of potentiometer $P_r$. The voltage regulator compares these voltages at its terminals 28 and 29 and controls the operation of the alternator 13 such that the current to the induction heating coil is kept at substantially the full rated value, as determined by the setting of $P_r$.

The relay contacts RC–7 are operated by the same relay, RC, which controls the operation of the previously mentioned relay contacts RC–3. When the coil of relay RC is energized, both of its normally opened sets of contacts RC–3 and RC–7 are closed.

The coil of relay RC is connected in an energization circuit shown at the upper end of FIG. 2. The arrangement is such that when the induction heating equipment is started up the coil of relay RC is energized, so as to close the previously described sets of contacts RC–3 and RC–7.

The energization circuit for the coil of relay RC includes a normally open set 33 of relay contacts which are arranged to be closed when the induction heating equipment is started up. In series between this set of relay contacts 33 and the coil of relay RC is a normally closed set of relay contacts FR–2, which are arranged to be operated by a relay FR which controls the automatic feeding of the work pieces through the induction heating coil. Initially this relay FR is de-energized so that the series-connected relay contacts 33 and FR–2 provide a path for the initial energization of the coil of relay RC. In parallel with the set of relay contacts, FR–2 is a series-connected combination consisting of a normally closed set of relay contacts RV–1 and a normally open set of relay contacts RC–1. These relay contacts RC–1 are closed when the coil of relay RC is initially energized. The set of relay contacts RV–1 is under the control of a relay RV which becomes energized only after the voltage has risen to the point 11 along the characteristic curve in FIG. 1, as described in detail hereinafter. A pilot lamp 34 is connected across the coil of relay RC to give a visual indication as to whether this relay coil is energized or not.

In order that the voltage regulator 15 may be controlled in response to voltage output from the alternator 13 after the initial phase of the heating cycle, there is provided a voltage transformer T–3 which has its primary winding connected across the output from the alternator. The opposite ends of the secondary winding of transformer T–3 are connected to each other through rectifiers 35 and 36 and thence through line 37 to the terminal 25 at the voltage regulator. The secondary winding of transformer T–3 is provided with a center tap 38 which is connected through line 39 and through the normally closed set of relay contacts RC–5 to the line 27 leading to the voltage regulator terminal 28.

With this arrangement, when the set of relay contacts RC–5 is closed (which can happen only when the set of relay contacts RC–3 is open) the voltage appearing at the voltage regulator terminal 28 and 25 is proportional to the output voltage from the alternator 13 which is applied to the induction heating coil 12.

The set of normally open relay contacts RC–5 is controlled by the coil of relay RC. As already mentioned, the coil of relay RC is energized at the beginning of the heat cycle, so that at this time the voltage regulator terminal 28 is disconnected from the potential transformer T–3. However, when the set of relay contacts RC–5 closes, which takes place later during the heating cycle, the voltage regulator 15 is switched over to be responsive to the magnitude of the voltage output from the alternator 13.

For the purpose of adjustably setting the voltage regulator to cause the alternator 13 to operate at substantially full rated voltage during this later phase of the heating cycle, there is provided a potentiometer $P_v$. This potentiometer has one end of its resistance element 40 connected through line 41 to the voltage regulator terminal 25. The opposite end of the resistance element of potentiometer $P_v$ is connected to the terminal 31. The adjustable contact 42 of this potentiometer is connected through a normally closed set of relay contacts RC–8 to the voltage regulator terminal 29. Relay contacts RC–8 are under the control of relay RC such that these contacts are closed when the coil of relay RC is de-energized and are open when the coil of relay RC is energized. When the former condition prevails, the setting of adjustable contact 42 of potentiometer P$_v$ determines the voltage setting for the alternator.

The output line 39 leading from the potential transformer T-3 is connected through a set of normally open relay contacts RC-4 to the upper end of the resistance element in each of three different potentiometers P-1, P-2, and P-3.

The adjustable contact 43 of potentiometer P-3 is connected through the coil of a relay CC to the line 24 leading to the voltage regulator terminal 25. A suitable condenser 44 is connected in parallel with the coil of relay CC. Relay CC has a set of normally open contacts CC-1 (lower right in FIG. 2) which control the operation of a capacitor contactor adding circuit. The arrangement is such that when the coil of relay CC is energized, its contacts CC-1 close and an additional capacitor is connected in circuit with the induction heating coil 12.

Potentiometer P-2 has an adjustable contact 45 which is connected through the coil of a relay FR to the line 24 leading to the voltage regulator terminal 25. A suitable condenser 46 is connected in parallel with the coil of relay FR. Relay FR is provided with a normally open set of contacts FR-1 (lower right in FIG. 2) which are connected in a circuit which controls the starting of the automatic feed mechanism 17 which feeds the work pieces into and through the induction heating coil. The arrangement is such that when the coil of relay FR is energized, its contacts FR-1 close and the feed mechanism is automatically started.

Potentiometer P-1 has an adjustable contact 47 which nected through the coil of a relay CC to the line 24 leading to the voltage regulator terminal 25. A condenser 48 is connected in parallel with the coil of relay RV. As already mentioned, relay RV is provided with a set of normally closed contacts RV-1 connected in the holding circuit for the coil of relay RC. Thus when the coil of relay RV is energized, its contacts RV-1 open and the coil of relay RC becomes de-energized.

The adjustable contacts of the potentiometers P-1, P-2 and P-3 have individual settings so that the corresponding relays RV, FR and CC become energized at predetermined values of the voltage appearing in line 39. As already stated, this voltage is proportional to the output voltage from the alternator 13.

By adjusting the potentiometers P-1, P-2 and P-3 individually the respective relays RV, FR and CC may be pre-set to become energized at particular selected alternator output voltages. To do this, the potentiometer is set at its maximum resistance setting. The alternator output voltage is set at the value at which it is desired that the relay become energized. Then the resistance of the potentiometer is gradually reduced until the corresponding relay coil becomes energized. This point may be detected by providing a set of normally-open contacts (not shown) operated by this relay coil and connected in series with a pilot light (not shown) across a suitable power supply. When the relay coil becomes energized, this set of contacts closes and the pilot light lights up.

The foregoing adjustment is made for each of these relays individually, while switch 50 temporarily closes line 51.

In the operation of this control, when the induction heating equipment is first energized, the coil of relay RC is energized immediately through the circuit which includes the contacts 33 and FR-2. Once energized, relay RC closes its normally-open set of contacts RC-1 to complete a holding circuit for this relay. This holding circuit maintains relay RC energized until the normally closed set of contacts RV-1 is opened in response to the energization of the coil of relay RV later on in the heating cycle.

With the coil of relay RC energized, as described, the relay contacts RC-3, RC-4 and RC-7 are closed and the relay contacts RC-5 and RC-8 are open. Under these conditions the potentiometer P$_r$ determines the setting of the voltage regulator 15. The current supplied by the alternator 13 to the induction heating coil 12 produces a voltage in the current transformer T-1 which is coupled through the transformer T-2 to the terminal 28 in the voltage regulator. At this time the voltage regulator is disconnected from the potential transformer T-3 because the relay contacts RC-5 are open. In the voltage regulator 15, the voltage applied to its terminal 28, which is proportional to the heating coil current, is compared with the reference voltage at its terminal 29 which is determined by the setting of potentiometer P$_r$. The voltage regulator 15 automatically functions to maintain the potential at terminal 28 equal to the reference voltage. It does so by controlling the voltage across the alternator field winding 14 so as to maintain a constant output current from the alternator which will produce a voltage at the voltage regulator terminal 28 equal to the reference voltage. The setting of potentiometer P$_r$ is so chosen that this constant output current from the alternator 13 will be at substantially 100% of the full rated value for the induction heating equipment in question.

During this time, the voltage across the potential transformer T-3 is applied through line 39 and the now-closed set of relay contacts RC-4 to the coil of each of the relays CC, FR and RV through the corresponding potentiometers P-3, P-2 and P-1.

The first one of these relays to operate is the relay CC, which, when energized, closes the relay contacts CC-1 to add a capacitor to the induction heating coil circuit. Since the addition of such capacitor may result in a voltage surge of the alternator, the condensers 44, 46, and 48 are provided to prevent premature operation of the relays FR and RV. Each of these condensers has a capacitance of 100 milli-micro-farads and each of the relay coils RV and FR has a resistance of 10,000 ohms. Thus, each of these condensers and the resistance of the associated relay coil provides a resistance-capacitance time delay network which prevents premature energization of the relays RV and FR under these circumstances.

When the coil of relay FR is energized, it closes the set of relay contacts FR-1 which completes an energization circuit for starting the automatic feed mechanism which moves the work pieces successively into and through the induction heating coil.

When the output voltage from the alternator 13 has risen to the point 11 on the characteristic curve in FIG. 1, at which point relay RV becomes energized, the relay contacts RV-1 in the holding circuit for the coil of relay RC open, de-energizing relay RC. Such de-energization of relay RC causes the latter's relay contacts RC-3, RC-4 and RC-7 to resume their normally open condition. At the same time, the relay contacts RC-5 and RC-8 resume their normally closed condition. Consequently the voltage at the mid tap 26 on transformer T-2, which is proportional to the current to the induction heating coil 12, is disconnected from the terminal 28 in the voltage regulator. At the same time, the voltage in line 39, which is proportional to the voltage applied to the induction heating coil 12, is connected through the now-closed relay contacts RC-5 to the terminal 28 in the voltage regulator. From here on the voltage regulator responds to the magnitude of the voltage output of the alternator 13, rather than to the magnitude of the current output of the alternator. The setting of the adjustable contact 42 on the potentiometer P$v$ determines the regulated voltage output from the voltage regulator and thereby determines the voltage across the alternator field winding 14. In this manner, the output voltage from the alternator 13 is held substantially constant at a level of about 100% of its full rated value.

From the foregoing, it will be apparent that the present invention provides a control for the current and voltage applied to the induction heating coil which positively insures against any overloading of the induction heating equipment, either during the initial portion of the heat cycle when the voltage is below its full rated value, or during the later portion of the heating cycle, when the voltage is at substantially its 100% rated value. At the same time, the duration of the initial portion of the heating cycle is no longer than necessary because during this entire time the current applied to the induction heating coil is at substantially 100% of the full rated value.

At the same time, the present invention includes provision for automatically adding a capacitor into the induction heating coil circuit, for controlling the start of the work piece feeding mechanism, and for switching over from current-responsive voltage regulation to voltage-responsive voltage regulation, all under the direct control of the actual output voltage from the alternator which supplies power to the induction heating coil. Thus, the complete control system of the present invention responds to the actual current and voltage applied to the induction heating coil during the different phases of the heating cycle, rather than being controlled by a timer which is preset on the basis of an assumption of certain operating conditions which may or may not hold true for the particular work load involved.

With the present control arrangement, if the heating equipment should be shut down for a short time and then started up again, with the work pieces inside the heating coil retaining an indeterminate amount of residual heat, the control will operate initially in response to the magnitude of the current to the heating coil. Initially, this current will be held at substantially its full rated value to insure maximum heating up of the equipment. However, as soon as the voltage rises to a predetermined value (determined by the setting of potentiometer P-1) and regardless of the elapsed time since the equipment was re-started, the control will switch over automatically to hold the voltage at substantially the full rated value.

Furthermore, the capacitor-adding relay CC and the relay FR which starts the automatic feeding of the work pieces are both similarly operated in a positive manner in response to the actual voltage being applied to the heating coil.

Thus, it will be apparent that the illustrated embodiment of the present control solves the difficulties previously associated with equipment of this type. However, it is to be understood that, while there has been described in detail herein and illustrated in the accompanying drawing a specific presently-preferred embodiment of this invention, various modifications, omissions and refinements which depart from the disclosed embodiment may be adopted without departing from the spirit and scope of this invention.

Having thus described my invention, I claim:

1. In a control for induction heating equipment which includes an induction heater, power supply means for supplying power to said heater, and a voltage regulator for regulating the power output from said power supply means to the heater, the improvement which comprises: means for operating said voltage regulator in response to the magnitude of the current supplied by said power supply means to said heater to maintain said current at a predetermined value during the initial phase of the heating operation of said equipment, and means operative in response to the voltage from said power supply means to disable said first-mentioned means when said voltage has risen to a predetermined value and operative to operate said voltage regulator in response to the magnitude of said voltage to maintain said voltage at a preselected higher value during the continued heating operation of said equipment.

2. In a control for induction heating equipment which includes an induction heater, power supply means for supplying power to said heater, and a voltage regulator for regulating the power output from said power supply means to the heater, the improvement which comprises: means for operating said voltage regulator in response to the magnitude of the current supplied by said power supply means to said heater to maintain said current at substantially 100% of its full rated value for said equipment during the initial phase of the heating operation of said equipment, and means operative in response to the magnitude of the output voltage from said power supply means to disable said first-mentioned means when said voltage has risen to a predetermined value and to operate said voltage regulator in response to the magnitude of said voltage to maintain said voltage at substantially its 100% rated value during the continued operation of said equipment.

3. In a control for induction heating equipment which includes an induction heater, power supply means for supplying power to said heater, and a voltage regulator for regulating the power output from said power supply means, said voltage regulator having a pair of control terminals and operable to produce an output voltage which varies with differences in the respective voltages at said control terminals, the improvement which comprises: first means for deriving a voltage which is proportional to the current to said induction heater, a first circuit for applying said voltage to one of said control terminals in the voltage regulator which includes a first set of normally open relay contacts, a relay connected to be energized at the start of a heating operation of said equipment and operable to close said first set of contacts, a current control potentiometer, a second circuit connecting said potentiometer to the other of said control terminals in the voltage regulator and including a second set of normally-open relay contacts operated by said relay, said current control potentiometer being adjustable to adjust the voltage on said other control terminal in voltage regulator so that the current to said induction heater is maintained at substantially its full rated value following the energization of said relay, second means for deriving a voltage which is proportional to the voltage on said induction heater, a third circuit for applying said last-mentioned derived voltage to said one control terminal in the voltage regulator and including a third set of normally-closed contacts operated by said relay, said third set of contacts being opened in response to the energization of said relay to disconnect said third circuit from the voltage regulator at the start of the heating operation, a voltage control potentiometer, a fourth circuit connecting said voltage control potentiometer to said other control terminal in the voltage regulator and including a fourth set of normally-closed contacts which are operated by said relay, said fourth set of contacts being opened in response to the energization of said relay to disconnect said voltage control potentiometer from the voltage regulator at the start of the heating operation, and means responsive to the magnitude of the voltage to the induction heater for de-energizing said relay when the voltage to the induction heater rises to a predetemined value, whereby to disconnect said first circuit and said current control potentiometer from the voltage regulator and to connect said third circuit and said voltage control potentiometer to the voltage regulator, said voltage control potentiometer being adjustable to adjust the voltage on said other control terminal in the voltage regulator so that the voltage to the induction heater is maintained at substantially its full rated value following said de-energization of said relay.

4. The control of claim 3 wherein said last-mentioned means comprises a relay connected to said second voltage deriving means ahead of said third set of contacts, means for adjustably presetting said last-mentioned relay to become energized when said last-mentioned derived voltage reaches a predetermined value, and a set of contacts connected in the energization circuit for said first-mentioned relay and operated by said last-mentioned relay de-energize said first-mentioned relay in response to said energization of said last-mentioned relay.

5. The control of claim 4 wherein there is provided an additional relay connected to said second voltage deriving means ahead of said third set of contacts, means for adjustably pre-setting said additional relay to become energized when said last-mentioned derived voltage reaches a predetermined value, and means responsive to the energization of said additional relay for connecting additional capacitance in circuit with said induction heater.

6. The control of claim 4 wherein there is provided an added relay connected to said second voltage deriving means ahead of said third set of contacts, means for adjustably pre-setting said added relay to become energized when said last-mentioned derived voltage reaches a predetermined value, and means responsive to the energization of said added relay for feeding workpieces into and through the induction heater.

7. In a control for induction heating equipment which includes an induction heater and power supply means connected to said heater to supply power thereto, the improvement which comprises a voltage regulator having its output coupled to said power supply means to control the power output of said power means, means for sensing the magnitude of the current supplied by said power supply means to said induction heater, said sensing means being coupled to said voltage regulator to supply an input signal thereto whose magnitude varies with the magnitude of the current to said induction heater, and means for applying to said voltage regulator a reference input signal whose magnitude is compared in said voltage regulator with said input signal from said current sensing means to control the output signal from said voltage regulator to said power supply means so as to maintain the current to said induction heater at substantially its maximum rated value during the initial phase of the heating operation of said equipment.

8. In a control for induction heating equipment which includes an induction heater and an alternator connected to said heater to supply power thereto, said alternator having a field winding which controls the power output of the alternator, the improvement which comprises a voltage regulator having its output connected to said field winding to apply a voltage across said field winding which determines the power output of the alternator, means for sensing the magnitude of the current supplied by said alternator to said induction heater, said sensing means being coupled to said voltage regulator to supply an input signal thereto whose magnitude varies with the magnitude of the current to said induction heater, and adjustable means for applying to said voltage regulator a reference input signal of adjustable magnitude which is compared in said voltage regulator with said input signal from said current sensing means to control the voltage applied across said field winding by the voltage regulator so as to maintain the current to said induction heater at substantially its maximum rated value during the initial phase of the heating operation of said equipment.

9. In a control for an induction heater, power supply means for supplying power to said heater, a voltage regulator for regulating the power output from said power supply means, means for controlling said voltage regulator in response to the current supply by said power supply during an initial phase of the heating cycle, means for controlling said voltage regulator in response to the voltage supplied by said power supply during a later phase of the heating cycle, power supply voltage responsive means for changing from said current responsive control to said voltage responsive control, and means including a relay operative in response to the magnitude of voltage supplied to said induction heater by the power supply for connecting additional capacitance in said induction heater when said voltage has risen to a predetermined value to maintain a substantial unity power factor presented to the power supply.

References Cited in the file of this patent

UNITED STATES PATENTS

| | | |
|---|---|---|
| 1,698,581 | Campbell et al. | Jan. 8, 1929 |
| 2,415,376 | Strickland | Feb. 4, 1947 |
| 2,464,336 | Michel | Mar. 15, 1949 |
| 2,511,026 | Wadhams et al. | June 13, 1950 |
| 2,534,902 | Cuttino | Dec. 19, 1950 |
| 2,543,248 | Ledeboer et al. | Feb. 27, 1951 |
| 2,604,574 | Riddell | July 22, 1952 |
| 2,615,962 | Cuttino | Oct. 28, 1952 |
| 2,632,091 | Hagopian | Mar. 17, 1953 |
| 2,773,192 | Blok et al. | Dec. 4, 1956 |
| 2,868,902 | Mika et al. | Jan. 13, 1959 |
| 2,928,924 | Rueggeberg | Mar. 15, 1960 |